UNITED STATES PATENT OFFICE.

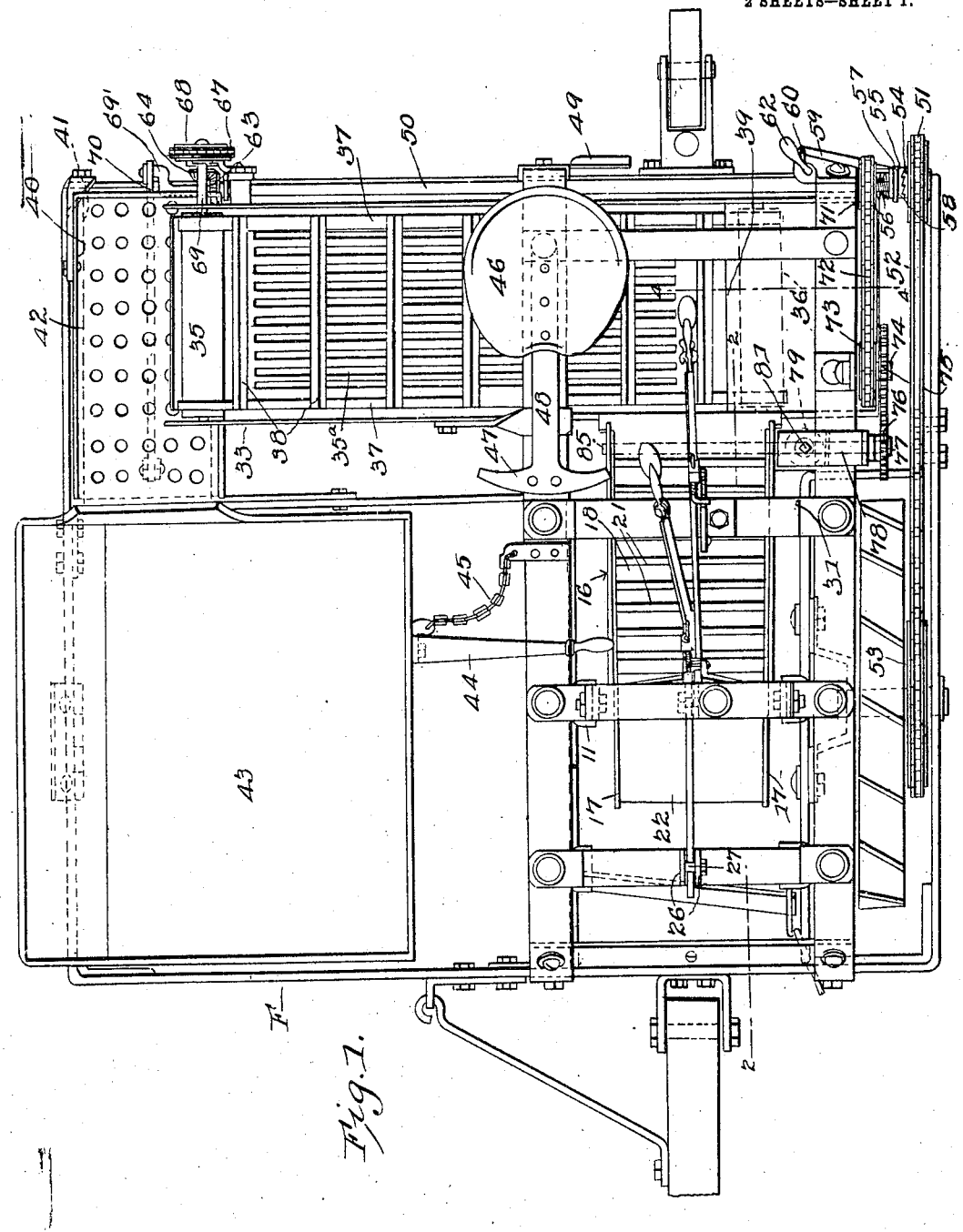

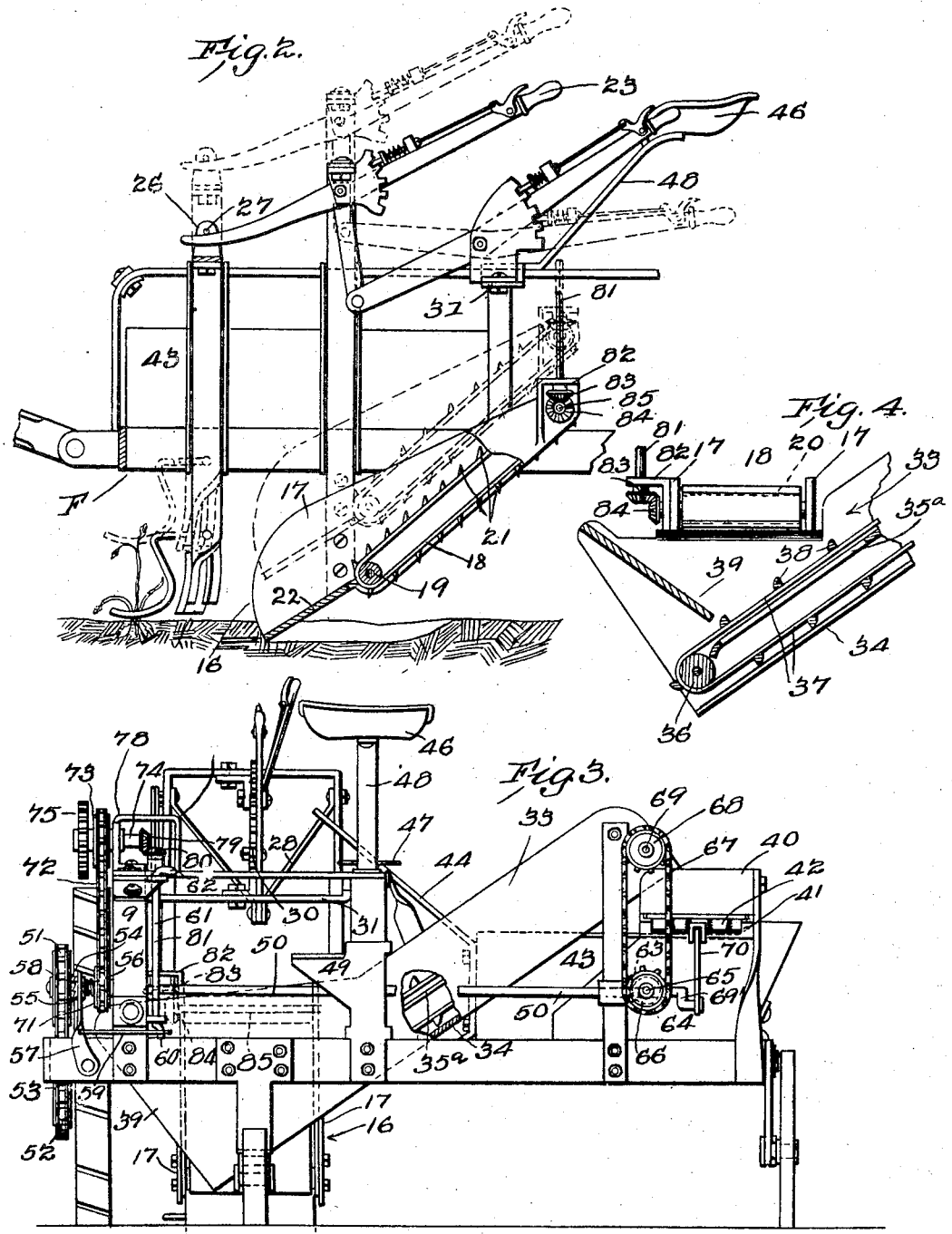

ALVIN F. CLARKE, OF EDWARDSVILLE, ILLINOIS.

POTATO-HARVESTER.

No. 833,705.  Specification of Letters Patent.  Patented Oct. 16, 1906.

Original application filed July 24, 1905, Serial No. 271,061. Divided and this application filed November 6, 1905. Serial No. 286,089.

*To all whom it may concern:*

Be it known that I, ALVIN FERDINAND CLARKE, a citizen of the United States, residing at Edwardsville, in the county of Madison and State of Illinois, have invented a new and useful Potato-Harvester, of which the following is a specification.

This invention relates to potato-harvesters, and it is a division of the application for Letters Patent for certain improvements in potato-harvesters, said patent having been granted to me on December 12, 1905, No. 806,871.

The present invention relates particularly to the mechanism for conveying the potatoes that are being dug by the digging apparatus of the machine to a receptacle, said conveying apparatus including means for cleaning the potatoes or freeing them from dirt and small and unmarketable potatoes, the objects of the invention being to simplify and improve this class of mechanism.

With these and other ends in view, which will readily appear as the nature of the invention is better understood, the same consists in the improved construction and novel arrangement and combination of parts, which will be hereinafter fully described, and particularly pointed out in the claim.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a top plan view of a potato-harvester constructed in accordance with the principles of the invention. Fig. 2 is a sectional detail view taken on the plane indicated by the line 2 2 in Fig. 1. Fig. 3 is a rear elevation with parts broken away. Fig. 4 is a sectional detail view taken on the plane indicated by the line 4 4 in Fig. 1.

Corresponding parts in the several figures are indicated throughout by similar characters of reference.

The frame F of the machine is provided with cutting mechanism having suitable means for adjusting it, and said frame and mechanism have been fully illustrated and described by me in the patent hereinbefore mentioned.

A digger-frame 16 is supported from the frame F and is provided on its inner sides with side members 17 of an elevator-frame containing an endless carrier 18, which is mounted upon rollers 19 and 20, supported for rotation near the lower and upper ends of said frame, respectively. The elevator consists of an endless apron of flexible, usually textile, material provided with cross-slats 21. Between the lower ends of the side members of the frame 16 is secured the digger 22, which consists of an inclined plane adapted for digging into the soil to excavate the potatoes, which, together with the dirt adhering thereto, will slide up the inclined plane and be delivered onto the elevator or carrier, whereby they are disposed of, as will be presently described.

The rear part of the frame F supports a transversely-disposed elevator or carrier-trough 33, having a solid bottom 34, above which is supported a screen 35$^a$. At the upper and lower ends of the trough adjacent to the upper and lower ends of the screen are rollers 35 and 36, supported for rotation and connected by endless belts 37, which in turn are connected by means of transverse slats 38, constituting a carrier. The lower end of the trough is provided with a receiving-hopper 39, whereby the potatoes discharged over the carrier 18 are deposited upon the carrier in the trough 33, said hopper serving to prevent the potatoes from dropping upon the ground.

Supported adjacent to and below the discharge end of the carrier contained in the trough 33 is a frame 40, slightly inclined in a forward and downward direction and having guide-flanges 41, upon which a screen 42 is supported for reciprocation. Said screen slightly overlaps a receptacle 43, which is hingedly supported upon the frame F and which is provided at its inner end with a lever or handle 44, whereby it may be manipulated to discharge its contents to one side of the machine. A flexible member, such as a chain 45, connects the inner edge of the receptacle 43 with the frame, said flexible member being intended as a check to prevent the receptacle from being tilted too far and also when the receptacle is tilted to enable the operator to restore it to normal position by simply pressing upon the chain with his foot.

A seat 46 for the driver or operator is supported upon one of the arches 9, foot-rests 47 being formed upon or connected with the seat-supporting spring 48. A foot-step 49 is also formed upon or connected with said arch member.

Supported in suitable bearings in the rear part of the frame is a transverse shaft 50, having at one end a loosely-mounted sprocket-wheel 51, which is connected by a link belt 52 with a sprocket-wheel 53, which is secured upon or connected with the hub of the bull-wheel 1. The hub of the sprocket-wheel 51 has a clutch member 54, adapted for engagement with a clutch member 55, which is feathered upon the shaft 50 and which is normally held in engagement with the clutch member 54 by the action of a suitably-disposed spring 56. A bifurcated lever 57, pivoted upon the rear of the frame, engages an annular groove 58 in the clutch member 55, and said lever 57 is connected by a link 59 with a crank 60 at the lower end of a vertically-supported shaft 61, having at its upper end a handle 62, whereby it may be turned for the purpose of throwing the clutch members 55 and 54 out of engagement, thereby permitting the sprocket-wheel 51 to rotate idly upon the shaft 50. Said shaft carries near its outer end a bevel-pinion 63, meshing with a bevel-pinion 64 upon a stub-shaft 65, which latter also carries a sprocket-wheel 66, which is connected by a chain 67 with a sprocket-wheel 68 upon the shaft 69 of the roller 35, which is thereby driven, thus driving the endless carrier in the trough 33. The shaft 50 terminates in a crank 69, which is connected by a pitman 70 with the reciprocatory screen 42, to which latter motion is thus transmitted.

The shaft 50 carries a fixed sprocket-wheel 71, which is connected by a chain 72 with a sprocket-wheel 73 upon a stub-shaft 74, which is supported for rotation in a bracket upon one of the arch members 9. The shaft 74 has a spur-gear 75 meshing with a spur-gear or pinion 76 upon a stub-shaft 77, supported for rotation in a bracket 78 upon the arch member 9. The shaft 77 also carries a bevel-pinion 79, meshing with a bevel-pinion 80, which slidably engages a non-circular shaft 81, which extends through suitable bearings in the bracket member 78 and the lower end of which has a bearing in a bracket 82, connected with one of the side members of the trough or casing in which the endless carrier 18 is supported. Said non-circular shaft has securely connected therewith a bevel-pinion 83, meshing with a bevel-pinion 84 upon the shaft 85, carrying the roller 20, which supports the upper end of the carrier 18 and imparts motion in the proper direction to said carrier.

It will be seen that under the construction described the digger-frame 16 may be raised or lowered without interrupting or affecting the movement of the endless carrier 18, this being obviously important, as the operator is thereby enabled to raise and lower the digger-frame while the machine is in operation, and thus to adjust the digger according to the condition of the crop.

The potatoes excavated by the digger are elevated by the carrier 18 and are dumped into the hopper at the receiving end of the carrier contained in the trough 33. The potatoes being thus dropped or dumped, the dirt adhering thereto will be dislodged and will pass between the bars of the screen contained within the trough 33. The endless carrier operating in the latter will thus serve to elevate the potatoes and to discharge them into the frame containing the reciprocatory screen 42, while the lower lead of said carrier will move the dirt, trash, and small and unmarketable potatoes which pass between the screen-bars downwardly over the solid bottom 34 of the trough, discharging such refuse at the lower end of the trough. The potatoes discharged upon the reciprocatory screen 42 are subjected to an additional cleansing operation, after which they are discharged into the tiltable receptacle 43, where they accumulate until it shall be desired to discharge them, which may be done at any time by manipulating the receptacle 43 by means of the lever or handle 44.

The construction of this improved potato-harvester, as will be seen from the foregoing description, is simple and inexpensive, and the operation thereof is practical and efficient.

Having thus described the invention, what is claimed is—

In a machine of the class described the combination, with a main frame; of an inclined wall carried by the frame, an oppositely-disposed screen adjacent said wall, said screen and wall constituting a hopper normally open at the bottom, a carrier extending around the screen and movable through the opening, slats upon the carrier adapted to substantially close the opening at predetermined intervals, a carrier for conveying material to the hopper, and a receptacle for receiving material from the carrier on the screen.

In testimony that I claim the foregoing as my own I have hereto affixed my signature in the presence of two witnesses.

ALVIN F. CLARKE.

Witnesses:
  Wm. R. Crossman,
  Dennis Hentz.